Aug. 9, 1960  T. S. LUBORE  2,948,260
CORN BUTTERING DEVICE
Filed July 24, 1958
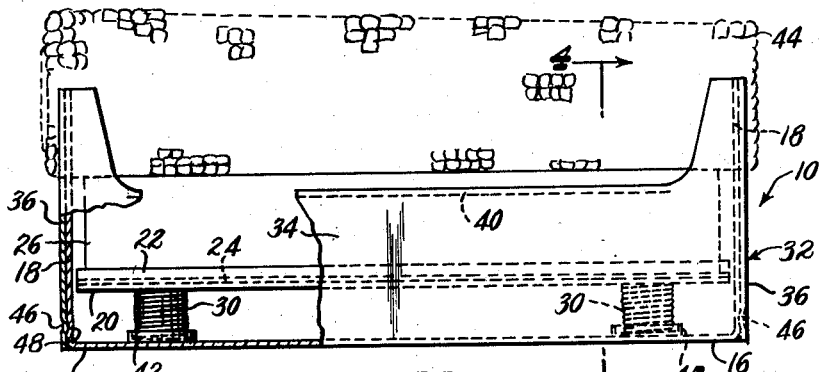
INVENTOR.
Terry S. Lubore
BY
Harry N. Schafer
ATTORNEY

United States Patent Office 2,948,260
Patented Aug. 9, 1960

2,948,260

CORN BUTTERING DEVICE

Terry S. Lubore, 6809 Riggs Road, West Hyattsville, Md.

Filed July 24, 1958, Ser. No. 750,729

9 Claims. (Cl. 118—13)

This invention relates to an improved coating means, and more specifically to a coating device intended especially to apply a coating of butter or butter substitute to an ear of corn.

The eating of corn-on-the-cob is very popular in this country. Most people prefer to apply a coating of butter on the ear of corn, after it has been cooked or roasted, and to sprinkle salt over the butter coating before eating. The application of the butter coating has proved to be a troublesome task, requiring deft manipulation of the usual spreading knife and the ear of corn to obtain an even spreading of the butter over the kernels of the corn.

An object of the invention, therefore, is to provide a coating device in which even a novice can quickly and evenly apply a coating to an ear of corn.

Another object of the invention is to provide a coating device having a movable platform or tray to carry a strip of butter, and a support and guide means to hold an ear of corn in contact with the butter while the ear of corn is slowly rotated to coat the corn with the butter.

Another object of the invention is to provide a coating device made up of a few parts which can be quickly taken apart and assembled for cleaning.

A still further object of the invention is to provide a coating device which may be readily charged with butter without taking any of the parts apart.

The above, and other objects, will become apparent from a consideration of the drawing in connection with the following specification.

In the drawing, in which similar reference characters are used to designate corresponding parts:

Fig. 1 is an elevational view, partly in section, of the coating device showing an ear of corn thereon in phantom lines;

Fig. 2 is a plan view thereof;

Fig. 3 is an end view; and

Fig. 4 is a sectional view taken along the line 4—4 of Fig. 1.

The coating device in its entirety is indicated by the reference numeral 10. It comprises, generally, the following principal parts: a housing 12, a movable tray 20, and a shroud 32.

The housing 12 comprises an elongated member having an open top, sides 14, a bottom 16, and opposite ends 18. From a study of Figs. 1, 3 and 4, it will be noted that the ends are higher than the sides, and that the ends are provided with recesses, as shown at 28, to provide support and guide means for an ear of corn 44.

The tray 20 is slightly smaller than the cross sectional area of the housing to permit it to freely move upwardly and downwardly in the housing without contacting the walls thereof, that is, to freely telescope therein. The tray is provided with upturned edges 22 on the sides thereof to retain a strip of butter 26 in place, and is also provided with longitudinally extending ridges or corrugations 24 to prevent a strip of butter from being laterally shifted when an ear of corn is rotated in contact with the butter. The tray is supported on a pair of spaced springs 30, carried within retaining cups 42 on the bottom 16 of the housing. If desired, corresponding cups may be carried on the bottom of the tray 20 to receive the upper ends of the springs 30.

Shroud 32 telescopically surrounds the housing, said shroud having an open top and bottom, side walls 34, and end walls 36. The end walls having the same height as end walls 18 of housing 12, and are provided with recesses 38 adapted to support and guide an ear of corn. The recesses 38 may be semicircular in form and are disposed to align with the recesses 28 in the end walls of the housing, as shown in Fig. 2. The side walls 34 are cut away, as shown in Fig. 1, and are provided with flanges 40. These flanges extend inwardly a short distance so as to lie in the path of movement of the tray, and serve to limit the upward travel of the tray under the action of the springs 30.

In order to removably secure the housing and shroud together, detent means are provided, consisting of protuberances 46 carried by shroud 32, which resiliently engage notches 48 in the end walls 18 of the housing. The protuberances and notches provide a locking means which resiliently and frictionally unite the shroud and housing, so that a person may lift the entire device by taking hold of the shroud.

The device may be made of any suitable materials, such as metals or plastics, or by combinations of such materials. The springs may be made of metal, or plastic.

In operation, the device may be assembled by placing springs 30 within the cups 42, and then placing the tray 20 within the housing 12 on the springs. Springs 30 should be of such length and strength as to urge tray 20, when loaded with a stick of butter 26, upwardly above the position that would be occupied by flanges 40 in Fig. 4. Shroud 32 is then placed in position about the housing 12, being pressed downward until flanges 40 engage the upturned edges 22 of tray 20 and the protuberances 46 engage the notches 48. This will tend to compress the springs 30 slightly.

The length of the device should measure about four or five inches, that is, slightly shorter than the usual length of an ear of corn. When the upturned edges 22 of tray 20 are in engagement with the flanges 40, the bottom of the tray 20 is slightly above the bottom of the recesses 28 and 38, as shown in Fig. 3, to assure that most of the coating material 26 will be applied.

A stick of butter 26 may then be placed on the tray. As pointed out above, the springs 30 are strong enough to retain the tray 20 in contact with flanges 40 when butter is on the tray. When it is desired to coat an ear of corn 44, the ear of corn may be held above the recesses 28 and 38, and lowered to the bottom thereof. The kernels of the ear of corn will contact the upper surface of the stick of butter 26, and will depress the tray with the butter thereon as shown in Fig. 4. The ear of corn may then be rotated, during which operation most of the kernels will be coated by the butter. During such rotation, the recesses 28 and 38 will provide a support and guiding means for the ear of corn while it is being coated.

As the butter is being consumed, a recess will be formed in the top thereof, and springs 30 will continue to urge the tray and butter thereon into contact with the ear of corn until the butter is exhausted. The corrugations will engage the bottom of the butter and prevent the stick of butter from being laterally shifted under the rotative action of the ear of corn.

While only a single modification has been shown and described, it is obvious that other modifications will become apparent within the scope of the appended claims.

I claim:

1. A coating device comprising a housing having a bottom wall, side walls, and an open top; a vertically movable tray having a rigid bottom within said housing; resilient means acting on said rigid bottom for supporting said tray and urging said tray upwardly; a shroud telescopically slidable about said housing; and means carried by said shroud for limiting the upward movement of said tray.

2. A coating device according to claim 1, in which said limiting means comprises flanges extending across a side wall of the housing into the path of upward movement of said tray.

3. A coating device according to claim 1, in which the housing and shroud include cooperating means to resiliently and frictionally secure together said housing and shroud.

4. A coating device according to claim 3, in which said securing means comprises detent means.

5. A coating device according to claim 1, said housing including means to rotatably support and guide an article to be coated.

6. A coating device according to claim 1, said shroud including means to rotatably support and guide an article to be coated.

7. A coating device according to claim 1, said housing and shroud including aligned means to rotatably support and guide an article to be coated.

8. A coating device according to claim 7, said support and guide means comprising recesses in the walls of said housing and shroud.

9. A coating device according to claim 1, said tray bottom including ridges adapted to resist movement of a coating material relative to the tray.

References Cited in the file of this patent

UNITED STATES PATENTS

| | | |
|---|---|---|
| 213,453 | Ruger | Mar. 18, 1879 |
| 2,340,048 | Dykeman et al. | Jan. 25, 1944 |
| 2,680,910 | Lloyd | June 15, 1954 |
| 2,808,020 | Arvidson | Oct. 1, 1957 |
| 2,855,280 | McConnaughey | Oct. 7, 1958 |